(12) United States Patent
Breeden et al.

(10) Patent No.: US 9,090,136 B2
(45) Date of Patent: Jul. 28, 2015

(54) HITCH PIN

(75) Inventors: Winston Breeden, Chagrin Falls, OH (US); Robert Johnson, Montville, OH (US)

(73) Assignee: Winston Products LLC, Cleveland, OH (US)

( * ) Notice: Subject to any disclaimer, the term of this patent is extended or adjusted under 35 U.S.C. 154(b) by 0 days.

(21) Appl. No.: 13/414,901

(22) Filed: Mar. 8, 2012

(65) Prior Publication Data
US 2012/0228853 A1    Sep. 13, 2012

Related U.S. Application Data

(60) Provisional application No. 61/450,393, filed on Mar. 8, 2011.

(51) Int. Cl.
*B60D 1/07*    (2006.01)
*B60D 1/06*    (2006.01)
*B60D 1/52*    (2006.01)

(52) U.S. Cl.
CPC .. *B60D 1/06* (2013.01); *B60D 1/07* (2013.01); *B60D 1/52* (2013.01)

(58) Field of Classification Search
CPC .............. B60D 1/02; B60D 1/52; B60D 1/07; B60D 1/075; B60D 1/025; B60D 1/06; F16B 7/042
USPC ........................................... 280/515, 507, 504
See application file for complete search history.

(56) References Cited

U.S. PATENT DOCUMENTS

| | | | | |
|---|---|---|---|---|
| 1,168,185 A * | 1/1916 | Fleck | ............................... | 81/439 |
| 2,644,359 A * | 7/1953 | Lydle | ........................... | 81/124.4 |
| 2,760,799 A * | 8/1956 | Smith | .......................... | 403/346 |
| 3,416,395 A * | 12/1968 | Hanson | ........................... | 81/125 |
| 3,742,790 A * | 7/1973 | Galley | ........................ | 81/124.5 |
| 4,467,677 A * | 8/1984 | Grifford | .......................... | 81/439 |
| 4,939,960 A * | 7/1990 | Kinzli | .......................... | 81/124.4 |
| 5,020,398 A * | 6/1991 | Leu | ............................... | 81/124.4 |
| 5,092,025 A * | 3/1992 | Harrington | ................... | 29/522.1 |
| D326,036 S * | 5/1992 | Anderson | ........................ | D8/21 |
| 5,186,083 A * | 2/1993 | Hsiao | .......................... | 81/124.4 |
| 5,664,445 A * | 9/1997 | Chang | ................................. | 70/34 |
| 5,685,207 A * | 11/1997 | Hubert | ........................ | 81/177.5 |
| 5,713,252 A * | 2/1998 | Iwinski et al. | .................. | 81/439 |
| D399,716 S * | 10/1998 | Carr | ................................ | D8/21 |
| D409,060 S * | 5/1999 | Lucy | ................................ | D8/24 |
| 6,138,992 A * | 10/2000 | Bell | ............................... | 254/326 |
| 6,345,554 B1 * | 2/2002 | Wang | ........................... | 81/124.4 |
| 6,672,115 B2 * | 1/2004 | Wyers | ............................... | 70/14 |
| D497,576 S * | 10/2004 | Wang | ............................ | D12/162 |
| 7,055,844 B1 * | 6/2006 | Bostedt | ...................... | 280/491.5 |
| 7,080,580 B2 * | 7/2006 | Gordon | ........................ | 81/124.7 |
| 7,089,831 B2 * | 8/2006 | Chen | .............................. | 81/124.4 |
| D546,663 S * | 7/2007 | Recknagel et al. | ............ | D8/339 |

(Continued)

*Primary Examiner* — Joseph Rocca
*Assistant Examiner* — Michael Stabley
(74) *Attorney, Agent, or Firm* — Cooper Legal Group, LLC

(57) ABSTRACT

A hitch pin for use in a hitch assembly is provided. The hitch pin includes a first end portion, a second end portion, and a transition portion. The size of the first end portion is different relative to the size of the second end portion. The two end portions are configured to fit different size apertures defined by a hitch assembly component. In further examples, the hitch pin can include a first end portion, a second end portion, a third end portion, and a transition portion. The first end portion is of a different size relative to both the second end portion and the third end portion.

18 Claims, 3 Drawing Sheets

(56) References Cited

U.S. PATENT DOCUMENTS

| | | | |
|---|---|---|---|
| 7,306,275 B2* | 12/2007 | Kalous | 296/1.07 |
| 7,316,534 B2* | 1/2008 | Hohmann et al. | 411/340 |
| 7,338,065 B1* | 3/2008 | Clausen | 280/507 |
| D628,867 S * | 12/2010 | Kamigaki | D8/26 |
| 2011/0289692 A1* | 12/2011 | Marek | 7/117 |

\* cited by examiner

HITCH PIN

CROSS-REFERENCE TO RELATED APPLICATIONS

This application claims the benefit of U.S. Provisional Application No. 61/450,393, entitled "Hitch Pin," filed Mar. 8, 2011, the entire disclosure of which is hereby incorporated herein by reference.

FIELD OF THE INVENTION

The invention relates to a hitch pin for securing a hitch insert received within a sleeve of a hitch assembly and, in particular, to a hitch pin having multiple sizes.

BACKGROUND OF THE INVENTION

Conventionally, hitches mounted to a towing vehicle included fixed components permanently secured to the vehicle. The hitch body was bolted or welded to the vehicle and included a hitch ball fixed to the hitch structure. As hitch manufacturers developed more uses for their hitches, the fixed ball has been replaced by a removable hitch insert received within a sleeve that is formed as part of the hitch body.

Both the hitch insert and sleeve had a similar, such as rectangular, configuration so that the sleeve would matingly receive the insert. To prevent inadvertent removal of the hitch insert from the sleeve, a hitch pin is inserted transversely through the insert and sleeve to mate the components. The insert could be conveniently removed for interchange to a different insert associated with an accessory such as a cargo platform, bike carrier, ski rack, etc. Today, various sizes of hitch inserts are available to users, and each size hitch insert utilizes a different size hitch pin.

BRIEF SUMMARY OF THE INVENTION

The following presents a simplified brief description of the invention in order to provide a basic understanding of some example aspects of the invention. This brief description is not an extensive overview of the invention. Moreover, this brief description is not intended to identify critical elements of the invention nor delineate the scope of the invention. The sole purpose of the brief description is to present some concepts of the invention in simplified form as a prelude to the more detailed description that is presented later.

In accordance with one aspect, the present invention provides a hitch pin including a first end portion, a second end portion, and a transition portion. The size of the first end portion is different relative to the size of the second end portion. The two end portions are configured to fit different size apertures defined by a hitch assembly component.

In accordance with another aspect, the present invention provides a hitch pin including a first end portion, a second end portion, a third end portion, and a transition portion. The first end portion is of a different size relative to both the second end portion and the third end portion. The three end portions are configured to fit different size apertures defined by a hitch assembly component.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
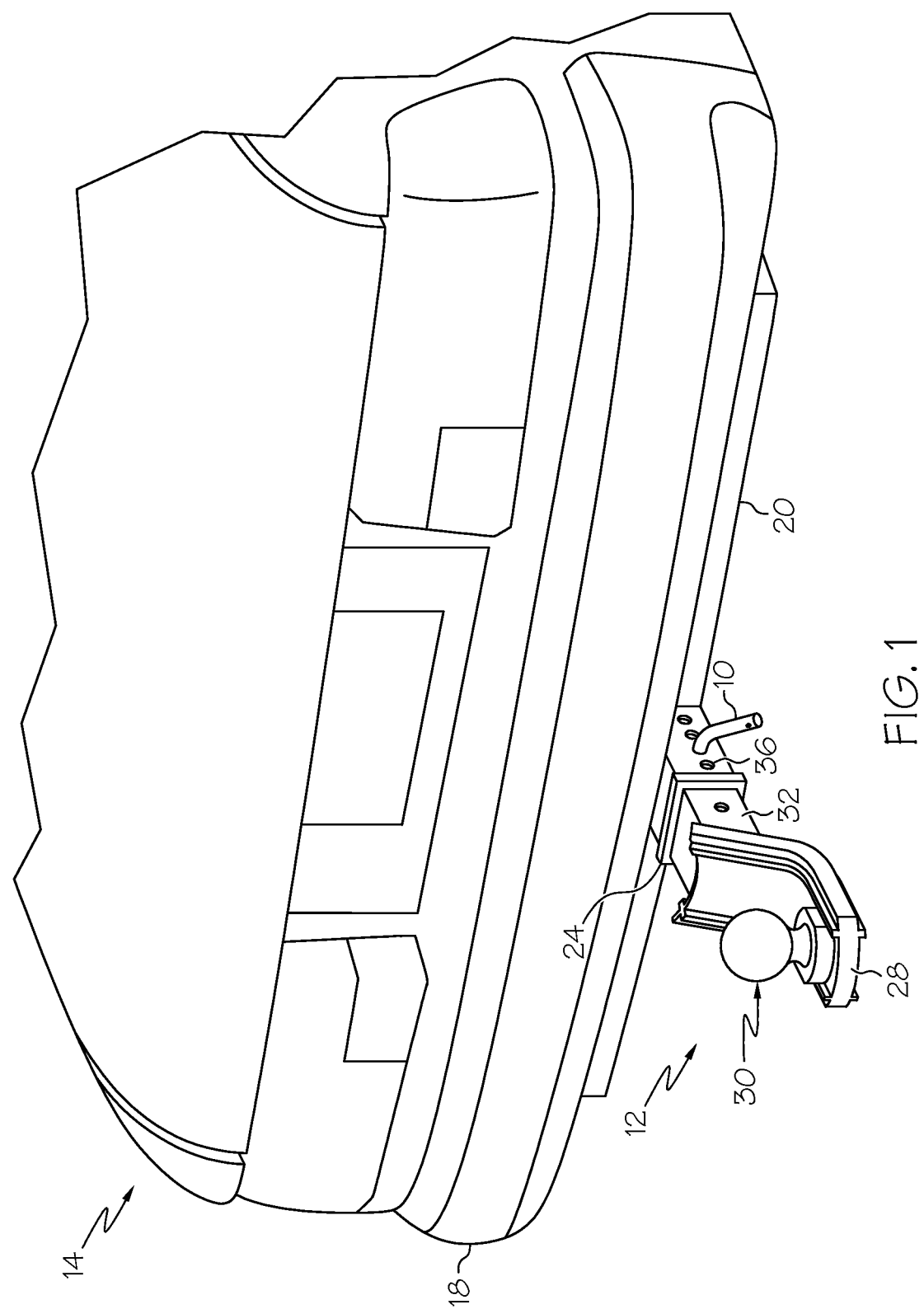
FIG. 1 is a perspective view showing an example hitch pin in accordance with the present invention used with a hitch assembly mounted to a rear portion of an automobile.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Turning to the shown example of FIG. 1, an example hitch pin 10 is illustrated according to at least one aspect of the present invention. The hitch pin 10 is shown in conjunction with various components of a hitch assembly 12 located on the rear of a vehicle 14. It is to be appreciated that FIG. 1 shows one example of possible structures/configurations/etc. and that other examples are contemplated within the scope of the present invention. In one specific example, the hitch pin 10 is generally usable with a conventional hitch assembly 12 suitable for mounting to a towing vehicle 14. The hitch assembly 12 can include various components that are described below. The structure of the hitch assembly 12 can vary from manufacturer to manufacturer and model to model, although the hitch assembly 12 includes structure for securely attaching the hitch assembly 12 to the vehicle 14 proximate the rear bumper 18. Typically, the hitch assembly 12 will include a crossbar 20 extending parallel to the rear of the vehicle 14 and a sleeve 24 secured to and extending perpendicular to the crossbar 20. The sleeve 24 typically has a square cross-sectional configuration although a variety of configurations could be employed. The sleeve 24 is adapted to receive a correspondingly configured hitch insert, such as a hitch insert 28 that includes a hitch ball 30. The hitch insert 28 often includes a male portion 32 that may be matingly inserted into the sleeve 24 for mounting to the hitch assembly 12. It is to be appreciated that while FIG. 1 shows the hitch insert 28 including a hitch ball 30, any number of other accessories intended to be detachably mounted to the hitch assembly 12 are possible, including cargo carriers, bicycle carriers, ski racks, folding tables, tailgating equipment, and/or a variety of coupler inserts.

In order to prevent withdrawal of the hitch insert 28 from the sleeve 24 during transport, the hitch insert 28 is secured within the sleeve 24. Both the sleeve 24 and the male portion 32 of the hitch insert 28 include apertures 36 that can be aligned with apertures of the mating component. Upon insertion of the hitch insert 28 into the sleeve 24 and alignment of the apertures 36, a hitch pin 10 may be inserted transversely through the aligned apertures 36 of the sleeve 24 and the hitch insert 28 to prevent withdrawal.

Conventionally, various sizes of hitch inserts 28 are available to consumers, and each size hitch insert 28 can utilize a different size hitch pin 10. For example, a higher towing capacity hitch insert 28 generally utilizes a hitch pin capable of supporting such increased towing capacity, while a lower towing capacity hitch insert 28 utilizes a lower towing capacity hitch pin. Generally, a higher towing capacity hitch pin has a relatively larger cross-sectional area. For example, two common hitch pin sizes are a ½-inch (0.5 inch) diameter pin and a ⅝-inch (0.625 inch) diameter pin. As can be appreciated, for hitch pins composed of the same material (e.g., a metal), a relatively larger diameter hitch pin can withstand greater shear forces, resulting in a hitch pin 10 with a higher towing capacity.

However, while a ½-inch hitch pin 10 may be inserted into apertures 36 sized for a larger ⅝-inch hitch pin 10, the reverse is not true. Moreover, it is generally inadvisable to utilize an undersized hitch pin because of the lack of towing capacity, and because the loose fit may enable the hitch insert 28 to move relative to the sleeve 24 or even fall out. While adapter tubing is available to temporarily increase the size of an undersized hitch pin, it is often difficult to use and easy to misplace. No adapter is available to decrease the size of an oversized hitch pin.

Figure 2:
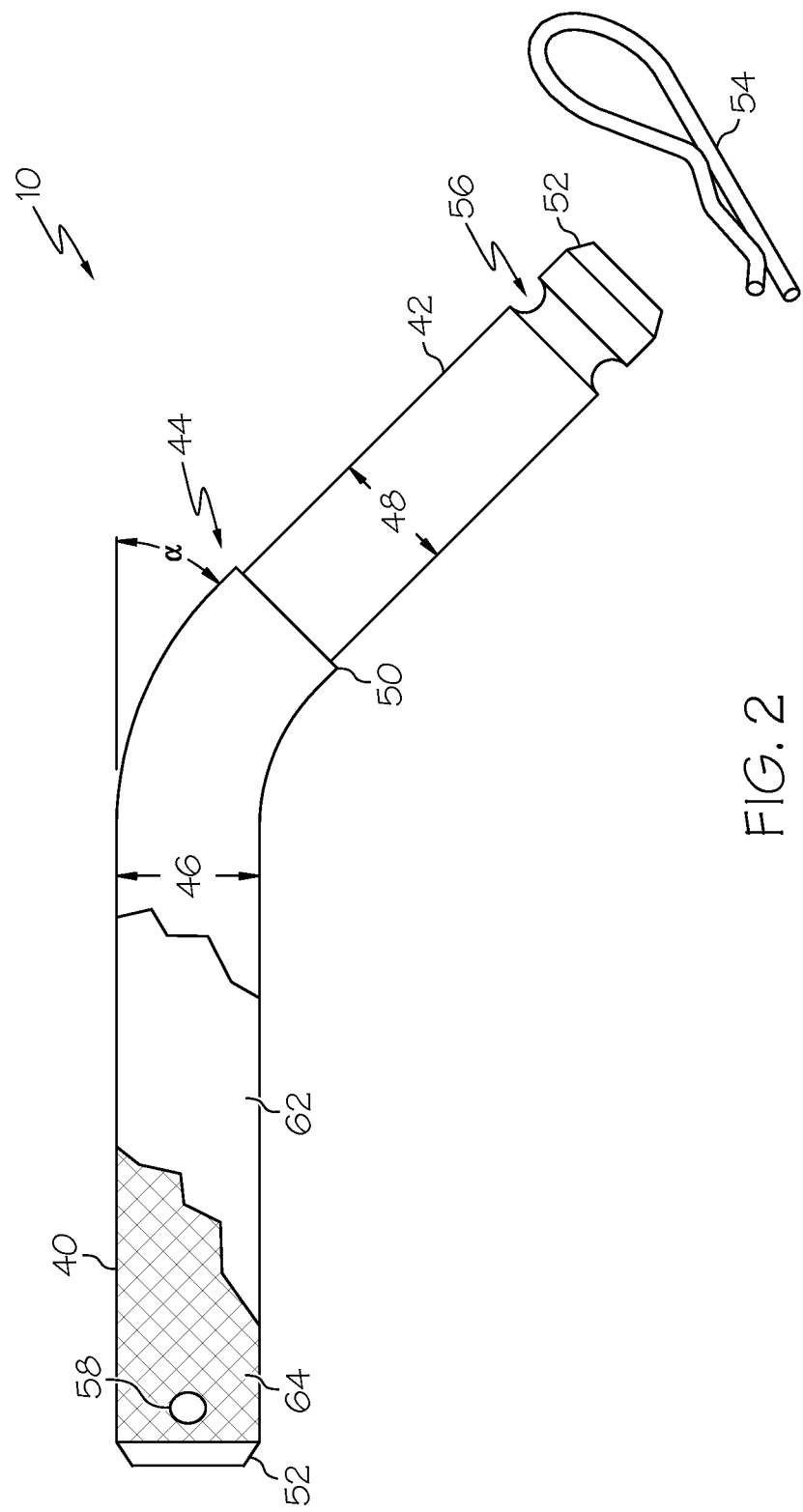
FIG. 2 is a side view of the example hitch pin of FIG. 1.

Turning to FIG. 2, the hitch pin 10 in accordance with an aspect of the present includes a first end portion 40 and a second end portion 42. The size of the first end portion is different relative to the size of the second end portion 42. The first end portion 40 and the second end portion 42 include multiple sizes that can be used with various size hitch inserts 28 and sleeves 24 (best seen in FIG. 1). In other words, a single, unitary hitch pin 10 is provided with two ends of different sizes. For example, a hitch pin 10 can have a first end portion 40 and a second end portion 42, each having a generally cylindrical shape. The first end portion 40 of the hitch pin 10 can have a diameter 46 of ⅝-inch (0.625 inch), while the second end portion 42 can have a diameter 48 of ½-inch (0.5 inch). Thus, the same hitch pin 10 can be utilized with hitch assembly components defining apertures 36 (best seen in FIG. 1) sized for either ½-inch or ⅝-inch hitch pins. An operator can use the hitch pin 10 interchangeably between different applications (e.g., different hitch assemblies on different vehicles) using apertures 36 simply by selecting the proper end portion of one hitch pin 10 to insert into the apertures 36. While particular size hitch pins (e.g., ⅝-inch and ½-inch diameters) are discussed, it is understood that various other, different sizes and combinations can also be utilized. Similarly, various cross-sectional geometries, which can be similar or different at the first end portion 40 and the second end portion 42 can be used.

The hitch pin 10 can be formed from a single, monolithic piece of material, such as a single piece of metal. For example, a single piece of metal can be milled on the second end portion 42 to provide a reduced diameter section. In another example, the single hitch pin 10 can be formed by removably or non-removably coupling multiple pieces together. For example, the first end portion 40 and the second end portion 42 can be welded together, screwed together, or held together with mechanical fasteners. It is contemplated that such a joint could be positioned so that the joint does not experience loading during use (e.g., outboard of the hitch/sleeve interface). This positioning would be beneficial to avoid locating any material weakness associated with the joint in a location that could experience mechanical loading. The hitch pin 10 can be constructed in various ways to be solid, hollow, or filled.

The hitch pin 10 includes a transition portion 44 located between the first end portion 40 and the second end portion 42. The transition portion 44 can include a shoulder 50 provided by an abrupt change in size (e.g., in diameter) as shown in FIG. 2. The shoulder 50 can define a maximum insertion depth for the relatively smaller second end portion 42. In another example, the transition portion 44 can include taper. A tapered transition portion 44 can facilitate locating (e.g., centering) the hitch pin 10 within the apertures 36. It is to be appreciated that the geometry of the transition portion 44 can also include any variation between a smooth taper and a shoulder or even combinations of tapers and shoulders.

Additionally, as shown, the hitch pin 10 generally includes a curved geometry, so that the first end portion 40 is disposed at an angle α other than 0° from the second end portion 42, such as a general L-shaped geometry (i.e., the axis of the first end portion 40 is not in-line with the axis of the second end portion 42). Such curved geometry can reduce the overall length of the hitch pin 10 during use and prevent the hitch pin 10 from passing completely through the apertures 36 defined by the sleeve 24 and the hitch insert 28. The curved geometry can also provide a handle-like grip for a user to grasp and manipulate the hitch pin 10. The curved geometry can also limit insertion depth of the hitch pin 10 into the apertures 36. Still other geometries (e.g., straight, angled, curved, etc.) are also contemplated. The hitch pin 10 as shown in FIG. 2 can be described as a boomerang hitch pin. Although described as a "boomerang," it is to be understood that this label does not imply any particular structure or function. Furthermore, at least one of the first end portion 40 and the second end portion 42 can include a tapered end 52. The geometry of the tapered end 52 can ease insertion of the hitch pin 10 into the apertures 36.

The hitch pin 10 can also include a retaining clip 54 to inhibit, such as prevent, inadvertent removal of the hitch pin from the apertures. The retaining clip 54 is one example of an anti-removal structure. As shown in FIG. 2, a common anti-removal structure includes a retaining clip 54 for transverse insertion onto or through a portion of the hitch pin 10. Thus, if the hitch pin 10 slides within the apertures 36, the retaining clip 54 will engage the sleeve 24 and/or the hitch insert 28 in mechanical interference to inhibit, such as prevent, inadvertent removal of the hitch pin 10. The retaining clip 54 can have various continuous or changing geometries, and may include bendable and/or resilient structure. While FIG. 2 shows only one form of a retaining clip 54, it is not intended to be limiting and various hitch pin clips, spring clips, cotter pins, keys, etc. can be utilized.

Both ends of the hitch pin 10 can be adapted for use with the retaining clip 54 and/or even a locking mechanism. For example, at least one of the first end portion 40 and the second end portion 42 can include a reduced cross-section area forming an annular groove 56 adjacent one or both ends of the hitch pin 10. The retaining clip 54 can be received in the annular groove 56 and extend generally transverse to the longitudinal axis of the hitch pin 10. In another example, the hitch pin 10 can define a hole 58 extending partially or completely through the hitch pin 10 adjacent one or both ends. The retaining clip 54 can be received in the hole 58 and can extend partially or completely through the hitch pin 10 generally transverse to the longitudinal axis of the hitch pin 10. Although illustrated and described as extending generally transverse to the hitch pin 10, it is to be understood that the retaining clip 54 can be arranged at various angles relative to the hitch pin 10. It is also to be understood that the hitch pin 10 can include one end having the annular groove 56, and the other end including the hole 58. It is also to be understood that either or both ends of the hitch pin 10 can be adapted to engage any of various locking mechanisms (not shown).

Additionally, some or all of the hitch pin 10 can include various surface finishes, coatings, and/or covers covering at least a portion of the hitch pin 10. For example, at least a portion of the hitch pin 10 can include a plastic or rubber coating 62. In other examples, portions of the hitch pin 10 can include a knurled surface 64 or other surface treatments promoting ease of grip for an operator. The surface finishes, coatings, and/or covers are not intended to alter the nominal size or diameter of the hitch pin so as to interfere with the design parameters associated with the fit between the apertures 36 and any of the end portions.

Figure 3:
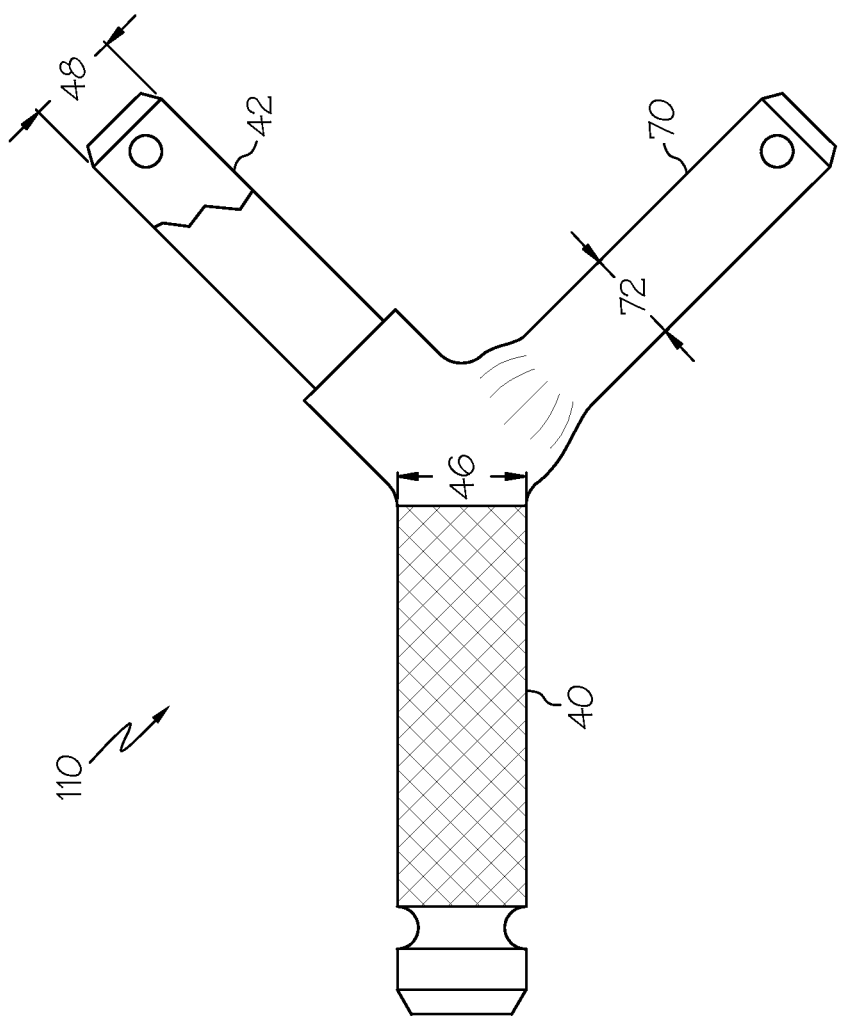
FIG. 3 is a side view of an example hitch pin in accordance with the present invention that can be used with the hitch assembly components of FIG. 1.

Turning to FIG. 3, the hitch pin 110 can also include a third end portion 70. The third end portion 70 can have a different size relative to the first end portion 40 and the second end portion 42. For example, a hitch pin 110 can have a first end portion 40, a second end portion 42 and a third end portion 70 having a generally cylindrical shape. The first end portion 40 of the hitch pin 10 can have a diameter 46 of ⅝-inch (0.625 inch), the second end portion 42 has a diameter 48 of ½-inch (0.5 inch), and the third end portion 70 has a diameter 72 of 9/16-inch (0.5625 inch). Thus, the same hitch pin 110 can be utilized with hitch assembly components defining apertures 36 (best seen in FIG. 1) sized for either ½-inch, ⅝-inch, or 9/16-inch hitch pins. An operator can use the hitch pin 110 interchangeably between different applications (e.g., different vehicles) using apertures 36 simply by selecting the proper end portion of one hitch pin 110 to insert into the apertures 36. While particular size hitch pins (e.g., ⅝-, 9/16-, and ½-inch diameters) are discussed, it is to be understood that various other sizes can also be utilized. Similarly, various cross-sectional geometries, which can be similar or different at the first end portion 40, the second end portion 42, and the third end portion 70 can be used. The third end portion 70 can be disposed at various angles relative to the first end portion 40 and the second end portion 42. Additionally, the third end portion 70 can be generally co-planar with the first end portion 40 and the second end portion 42 as shown. Alternatively, the third end portion 70 can be disposed at such an angle from the first end portion 40 and the second end portion 42 so that each end portion is 90° from either of the other end portions, similar to the three axes of a three-dimensional coordinate system.

It is to be appreciated that more than three (e.g., four) portions could also be provided. As such, one aspect of the present invention is the provision of at least two different sized portions, with the possibility of even more different sized portions. Also, so long as at least two different sized portions are provided, additional portions (e.g., a third portion) may have size duplication to one of the initial two different sized portions.

The invention has been described with reference to various example embodiments. Obviously, modifications and alterations will occur to others upon a reading and understanding of this specification. It is intended to include all such modifications and alterations.

What is claimed is:

1. A hitch pin including:
   a first end portion;
   a second end portion; and
   a transition portion located between the first end portion and second end portion,
   wherein a cross-sectional size of the first end portion is larger relative to a cross-sectional size of the second end portion, the two end portions being configured to fit different size apertures defined by a hitch assembly component and extend through the hitch assembly component, with the cross-sectional size of the first end portion extending along the length of the first end portion to the transition portion and the first end portion having an extent greater than the hitch assembly when fit within a respective size aperture defined by the hitch assembly and with the cross-sectional size of the second end portion extending along the length of the second end portion to the transition portion and the second end portion having an extent greater than the hitch assembly when fit within a respective size aperture defined by the hitch assembly; and
   wherein both of the first end portion and the second end portion includes a respective anti-removal structure, with the respective anti-removal structure of the first end portion being located adjacent to a tip of the first end portion and the respective anti-removal structure of the second end portion being located adjacent to a tip of the second end portion.

2. The hitch pin according to claim 1, wherein the first end portion and the second end portion have a generally cylindrical shape.

3. The hitch pin according to claim 2, wherein the first end portion has a diameter of ⅝-inch and the second end portion has a diameter of ½-inch.

4. The hitch pin according to claim 1, wherein the transition portion includes a shoulder, the shoulder defining a non-tapered size change between the first end portion located adjacent one side of the shoulder and the second end portion located adjacent an opposing second side of the shoulder.

5. The hitch pin according to claim 1, wherein the transition portion includes a taper.

6. The hitch pin according to claim 1, wherein the hitch pin is monolithic.

7. The hitch pin according to claim 1, wherein at least one of the first end portion and the second end portion include a tapered end.

8. The hitch pin according to claim 1, further including a surface finish covering at least a portion of the hitch pin, further wherein a hole extends through the first end portion.

9. A hitch pin including:
   a first end portion;
   a second end portion;
   a third end portion; and
   a transition portion, wherein the size of the first end portion is different relative to the size of the second end portion, the two end portions being configured to fit different size apertures defined by a hitch assembly component;
   wherein at least one of the first end portion, the second end portion, and the third end portion include an anti-removal structure.

10. The hitch pin according to claim 9, wherein the third end portion is of a different size relative to both the first end portion and the second end portion.

11. A hitch pin including:
   a first end portion;
   a second end portion;
   a third end portion; and
   a transition portion, the first end portion is of a different size relative to both the second end portion and the third end portion, the three end portions being configured to fit different size apertures defined by a hitch assembly component;
   wherein at least one of the first end portion, the second end portion, and the third end portion include an anti-removal structure.

12. The hitch pin according to claim 11, wherein the first end portion, the second end portion, and the third end portion have a generally cylindrical shape.

13. The hitch pin according to claim 11, wherein the first end portion has a diameter of ⅝-inch, the second end portion has a diameter of ½-inch, and the third end portion has a diameter different from the diameters of the first end portion and the second end portion.

14. The hitch pin according to claim 11, wherein the transition portion includes at least one shoulder.

15. The hitch pin according to claim 11, wherein the transition portion includes at least one taper.

16. The hitch pin according to claim 11, wherein the hitch pin is monolithic.

17. The hitch pin according to claim 11, wherein at least one of the first end portion, the second end portion, and the third end portion include a tapered end.

18. The hitch pin according to claim 11, further including a surface finish covering at least a portion of the hitch pin.

\* \* \* \* \*